United States Patent
Kelly et al.

(10) Patent No.: US 9,299,144 B2
(45) Date of Patent: Mar. 29, 2016

(54) EQUALIZING SMOOTHING FOR A SCAN COMPARISON TO DATABASE

(71) Applicants: Matthew David Kelly, Oxfordshire (GB); Thomas George Wright, Oxfordshire (GB)

(72) Inventors: Matthew David Kelly, Oxfordshire (GB); Thomas George Wright, Oxfordshire (GB)

(73) Assignee: Siemens Medical Solutions USA, INc., Malvern, PA (US)

( * ) Notice: Subject to any disclaimer, the term of this patent is extended or adjusted under 35 U.S.C. 154(b) by 0 days.

(21) Appl. No.: 13/912,473

(22) Filed: Jun. 7, 2013

(65) Prior Publication Data
US 2013/0329975 A1    Dec. 12, 2013

(30) Foreign Application Priority Data
Jun. 8, 2012  (GB) .................................. 1210124.2

(51) Int. Cl.
G06T 7/00    (2006.01)
(52) U.S. Cl.
CPC ..... G06T 7/0014 (2013.01); *G06T 2207/10104* (2013.01); *G06T 2207/30016* (2013.01)
(58) Field of Classification Search
CPC ................ G06T 7/0014; G06T 5/002; G06T 2207/30016; G06T 2200/04; G06T 2207/10108; G06T 5/50; G06T 7/00
See application file for complete search history.

(56) References Cited

U.S. PATENT DOCUMENTS

| 2009/0268953 | A1 | 10/2009 | Crucs |
| 2010/0290680 | A1* | 11/2010 | Declerck ................ A61B 6/037 382/128 |
| 2011/0235884 | A1* | 9/2011 | Schreibmann et al. ........ 382/131 |

FOREIGN PATENT DOCUMENTS

| GB | 2469569 B | 12/2011 |
| WO | WO 2010/016103 | 2/2010 |

OTHER PUBLICATIONS

Joshi et al., "Reducing between scanner differences in multi-center PET studies," NeuroImage, vol. 46, (2009), pp. 154-159.

* cited by examiner

*Primary Examiner* — Vu Le
*Assistant Examiner* — Kenny Cese
(74) *Attorney, Agent, or Firm* — Schiff Hardin LLP

(57) ABSTRACT

A method for facilitating comparison of image data from a given medical imaging protocol with archive image data, includes obtaining subject image data from a scan of a subject using the medical imaging protocol, obtaining archive image data differing from the subject image data in a given variable, determining a modifier usable to reduce the difference between the archive and subject image data, using the modifier to modify one of the subject image data and the archive image data to reduce the difference, and comparing the modified archive or subject image data with the subject or archive image data.

5 Claims, 2 Drawing Sheets

EQUALIZING SMOOTHING FOR A SCAN COMPARISON TO DATABASE

BACKGROUND OF THE INVENTION

1. Field of the Invention

The present invention is concerned with facilitating comparison of a medical image to a database relating to content of the medical image.

2. Description of the Prior Art

Comparing medical images of a patient to a database of scans acquired from normal subjects is a well-known technique for trying to highlight abnormalities in the patient scan: Equivalently, the patient could be compared to a database of scans showing a certain pattern of disease to look for either similarities or differences that can be used in the diagnostic process; these abnormalities can then be used in the process of diagnosis.

The process of comparison generally takes the form of the following steps:
  The patient's scan must be spatially normalized, that is to say that it must be possible to form a spatial correspondence between the patient's scan and the database to which it is being compared
  The patient's scan must be intensity normalized, that is to say that the intensity of voxels in the patient's scan must be normalised to remove, for example, differing rates of uptake in the tracer due to each patient's unique metabolism.

Additionally, a degree of smoothing (e.g., Gaussian) may be applied to the data to reduce noise and reduce some of the differences in image appearance that arise from different scanners and reconstruction algorithms, as well as from local physiological variations between patients.

Once the patient's data is spatially normalized, intensity normalized and smoothed, it can be compared to the database, where, for example, the number of standard deviations each voxel data is away from the mean can be computed: voxels whose data is significantly different from the average may be an indication of disease.

The database itself is constructed by following the same process for each of the scans that will be included in it. Once all scans have been spatially normalized, intensity normalized and smoothed, statistics are computed for each voxel in the volume across all the scans (e.g., mean and standard deviation), giving rise to output data volumes containing these statistics, which populate the database.

This type of analysis is most often performed in brain scans, since the relative similarity of the anatomy of different subjects makes the process of spatial and intensity normalization simpler. However, the principle is not restricted to such an organ once the process of normalizations can be resolved.

Different scanners (both different models from the same manufacturer and models from different manufacturers) and different reconstruction protocols (both algorithm type and parameterisation) can result in significantly different degrees of smoothing in the resulting image (i.e., reduction in resolution) that is finally read by a clinician. When doing the kind of database comparison analysis described above, matching the degree of smoothing across the scans used to build the database, and also matching the degree of smoothing in any new patient scan with that used in the database construction is fundamental in trying to minimize diagnostically irrelevant differences that arise simply from differences in resolution between the particular scanner/reconstruction combination used for the scan. For example, in scans from a scanner/reconstruction combination that produces higher resolution images, when compared to those used to build the database, small regions of high uptake may be present that were not visible in the database images purely due to the lower resolution.

A previously considered method is to use a fairly large, constant, degree of smoothing, since adding additional smoothing is less detrimental to the overall process than not using enough. However, this assumption breaks down, for example, when the input data is too dissimilar to the database, and in this situation a new database must be generated using data that more closely matches the new input data. Even when this is done, the fact that a constant amount of smoothing is used means that each scan is not optimised for comparison to the database, meaning that differences may not show up as clearly as they otherwise might do.

The ability to reduce voxel-wise variance between brain PET images from different scanners has recently been reported by Joshi et al (2009) as part of a multi-centre observational study: the Alzheimer's Disease Neuroimaging Initiative (ADNI). In this study, the physical Hoffman brain phantom was imaged on a range of different scanners, and the resulting images were further smoothed with a Gaussian filter to smooth all images to a common resolution. The additional smoothing factors were then applied to clinical data and demonstrated a reduction in differences between the scans.

SUMMARY OF THE INVENTION

The present invention addresses the problem of how to choose an appropriate amount of smoothing for each patient scan, such that the smoothed scan looks "similar", and is of comparable resolution, to the smoothed scans used in the construction of the database. The same technique can also be used to ensure that all scans used to build the database look "similar" enough.

The benefit of such embodiments is that the database can be made more accurate by incorporating refined smoothing levels, leading to potentially higher sensitivity of the database comparison scheme. Moreover, the system can make easier the inclusion of data that were not reconstructed using the same protocol or acquired on the same scanner, therefore allowing more data to be included in a database without having to impose too stringent conditions on the reconstruction protocol or the scanner on which it was acquired.

DESCRIPTION OF THE PREFERRED EMBODIMENTS

Figure 1:
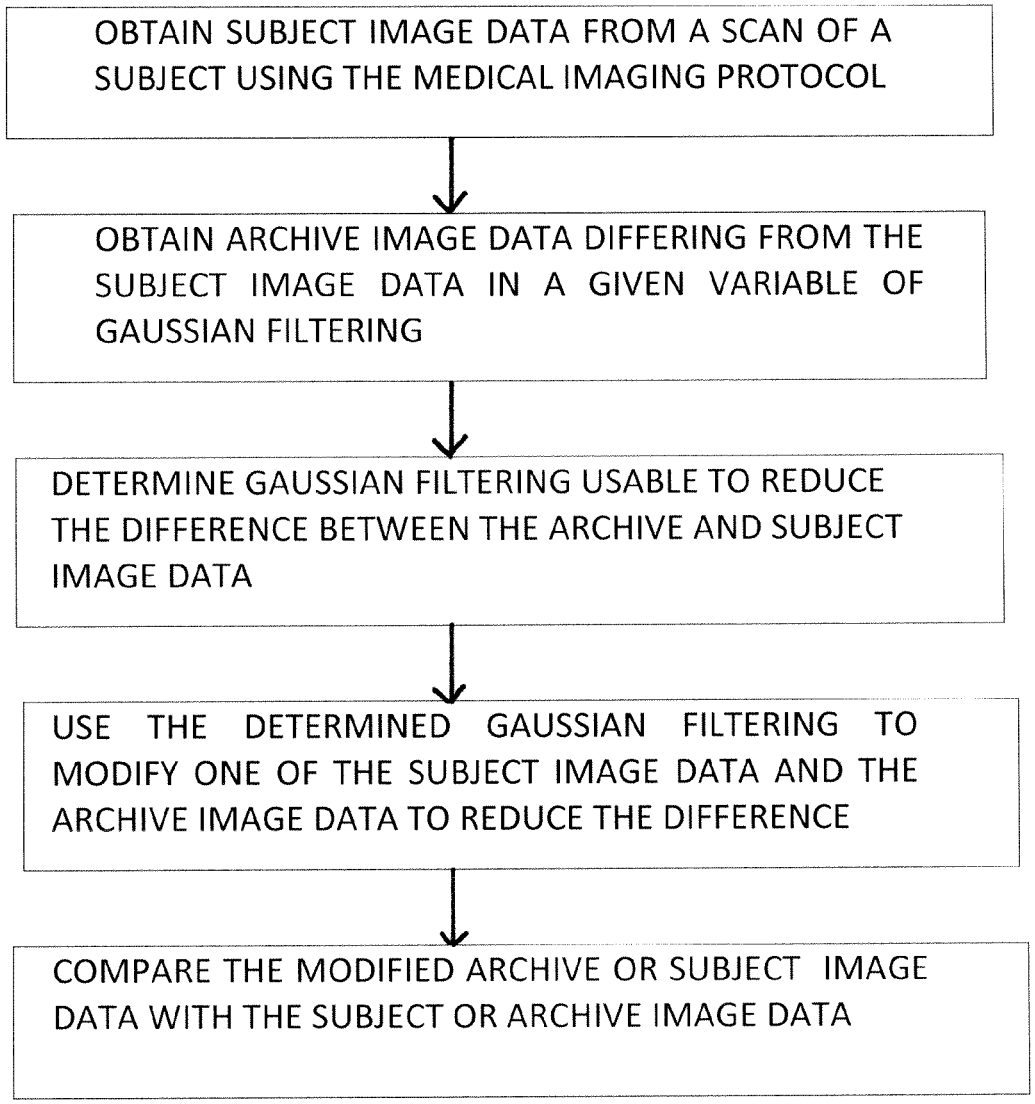
FIG. 1 is a flowchart of an embodiment of the method according to the invention.

Embodiments of this invention make use of some technology defined in GB 2469569 or US2010/0290680, both of which are hereby incorporated by reference herein, whereby an appropriate amount of additional Gaussian filtering is determined for many scanner and reconstruction protocol (algorithm and parameterisation) combinations. The goal of the technology is to apply just the right amount of smoothing to make the scans comparable for quantification from regions of interest. However, once the Gaussian filter sizes have been identified, they can be directly used to apply the correct amount of smoothing to equalise the smoothness of the scans, both within and in comparison to the database, as described above.

For example, consider a database that has been constructed using images from scanner/reconstruction combination "A" that have then been further smoothed with a 10 mm FWHM Gaussian. A clinician wants to compare a new dataset acquired with scanner/reconstruction combination "B". If the filter required to adjust scanner/reconstruction combination "A" to a given standard (as described in GB 2469569) is 8 mm FWHM Gaussian, and the filter required to adjust scanner/reconstruction combination "B" to the same standard is 4 mm FWHM, the additional smoothing that should be applied to the image being compared=$\sqrt{(10^2+8^2-4^2)}$=12.2 mm FWHM.

The technology defined in GB 2469569 or US2010/0290680 uses acquisitions of the NEMA IQ phantom to identify the appropriate filter to compensate for differences in scanner/reconstruction configuration. However, an alternative phantom, such as the Hoffman brain, may be used if found to be more appropriate for this application (e.g., neuroimaging).

As an alternative to producing a fixed normal database by smoothing all images to a common resolution, the database could be smoothed, with mean and standard deviation values computed on the fly. The amount of smoothing could be determined based on the dataset loaded for comparison. For example, a lower degree of smoothing could be selected when comparing data from a high resolution scanner, whereas a higher degree of smoothing could be used for data from an older scanner. This would enable the clinician to benefit from the improved resolution in their current scanner.

Embodiments of the invention may include features such as the following:

A method for building a database from captured medical image data of a number of subjects, including: pre-processing scans of an appropriate test image acquired on a comparable scanner model and reconstructed with comparable reconstruction algorithm and parameters to obtain the appropriate degree of smoothing; spatially normalizing each separate scan; intensity normalizing each separate scan; applying the previously computed degree of smoothing to each of the scans in turn; computing statistics from the collection of normalized, smoothed datasets.

The pre-processing step uses an image of a NEMA image quality phantom.

The statistics computed are voxel-wise mean and standard deviation.

The statistics computed are region-of-interest mean and standard deviation values.

A method for comparing a captured medical image data of a subject to a previously computed database, including: pre-processing a scan of an appropriate test image acquired on a comparable scanner model and reconstructed with comparable reconstruction algorithm and parameters to obtain the appropriate degree of smoothing; spatially normalizing the subject scan; intensity normalizing the subject scan; applying the previously computed degree of smoothing to the subject scan; comparing the normalized, smoothed dataset to the database.

The number of standard deviations away from the mean at each voxel is computed.

The number of standard deviations away from the mean of each region of interest is computed.

In FIG. 1, a flowchart is shown that sets forth the basic steps in an embodiment of the method according to the invention. In step S1, subject image data are obtained from a scan of the subject using a given medical imaging protocol. In step S2, archive image data are obtained, which differ from the subject image data in a given variable. In step S3, a modifier is determined that is usable to reduce the difference between the archive image data and the subject image data. In step S4, the modifier is used to modify one of the subject image data and the archive image data, in order to reduce the difference. In step S5, the modified archive image data is compared with the subject image data, or the modified subject image data is compared with the archive image data.

Figure 2:
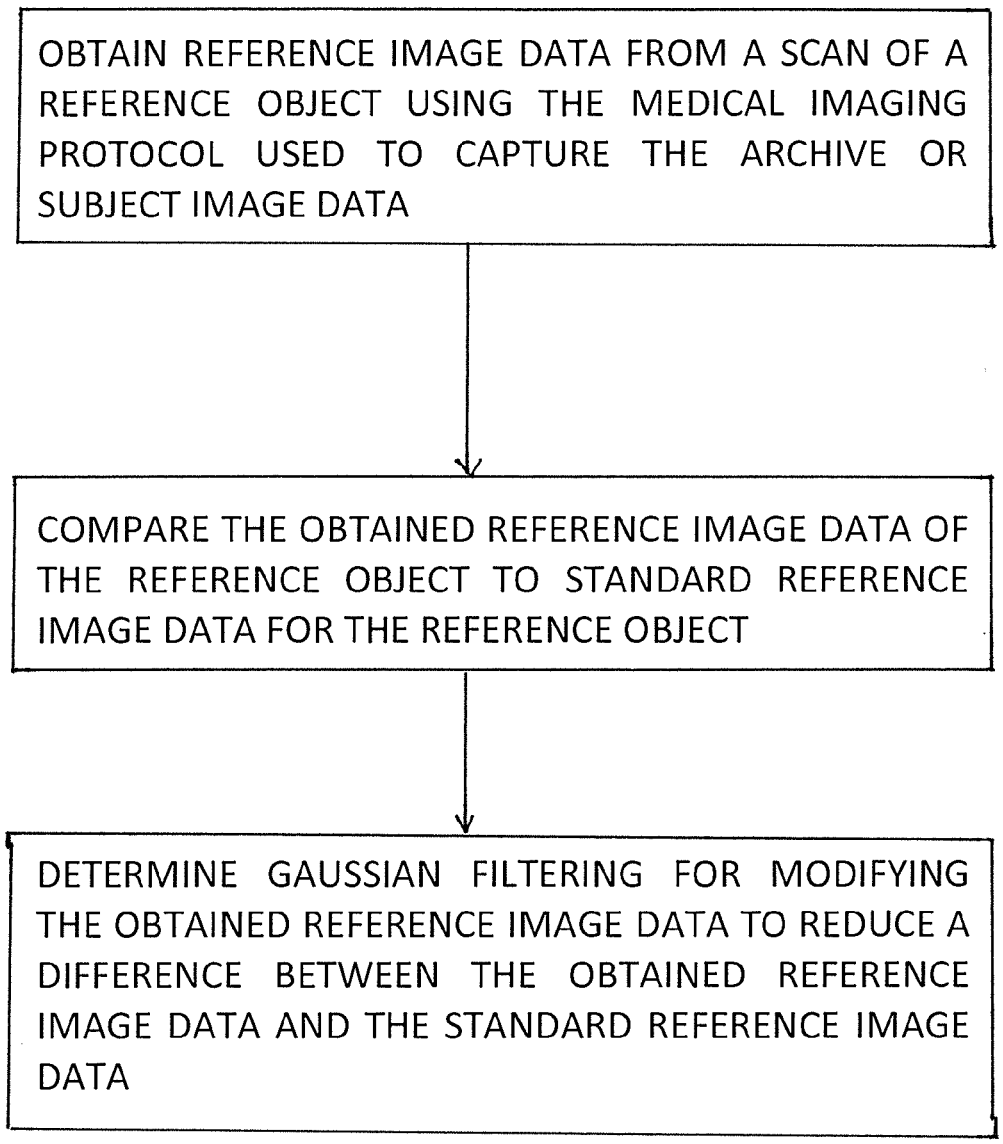
FIG. 2 is a flowchart of an embodiment of the method for determining the modifier in the embodiment of FIG. 1.

FIG. 2 shows an embodiment for determining the modifier in step S3 in the embodiment of FIG. 1. In the embodiment of FIG. 2, in step S3a, reference image data are obtained from a scan of a reference object using the given medical imaging protocol that was used to obtain the archive or the subject image data. In step Sib, the obtained reference image data of the reference object are compared to standard reference image data for the reference object. In step S3c, the modifier is determined as a factor modifying the obtained reference image data to reduce a difference between the obtained reference image data and the standard reference image data.

Although modifications and changes may be suggested by those skilled in the art, it is the intention of the inventor to embody within the patent warranted hereon all changes and modifications as reasonably and properly come within the scope of his contribution to the art.

We claim as our invention:

1. A method for facilitating comparison of image data from a given medical imaging protocol with archive image data, comprising:
   obtaining subject image data from a respective scan of a subject using the medical imaging protocol;
   providing the subject image data to a processor that performs Gaussian filtering;
   obtaining archive image data differing from the subject image data in a given variable of said Gaussian filtering;
   reducing a difference caused by said variable between the archive image data and subject image data for said reception scan, independently of scans of the subject other than the respective scan, by, for at least one of the archive image data and the subject image data, obtaining reference image data from a scan of a reference object using the medical imaging protocol used to capture the archive or subject image data, comparing the obtained reference image data of the reference object to standard reference image data for the reference object, and configuring said Gaussian filtering to modify the obtained reference image data to reduce a difference between the obtained reference image data and the standard reference image data;
   applying the Gaussian filter to modify one of the subject image data and the archive image data to reduce the difference; and
   displaying the modified archive or subject image data for comparison with the subject or archive image data.

2. A method according to claim 1, wherein further comprise determining a modifying factor for the other of the archive or subject image data, and combining the two modifying factors to arrive at the modifier.

3. A method according to claim 1, wherein the factor is the full width at half maximum of the Gaussian filter.

4. A method as claimed in claim 1 comprising determining said difference as a number of standard deviations away from a mean at each voxel in each of said archive image data and said subject image data.

5. A method as claimed in claim 1 comprising computing said difference by defining a region of interest in each of said archive image data and said subject image data, and computing a number of standard deviations away from a mean of the respective regions of interest in the archive image data and the subject image data.

\* \* \* \* \*